(12) United States Patent
Jung et al.

(10) Patent No.: US 9,888,432 B2
(45) Date of Patent: Feb. 6, 2018

(54) METHOD AND APPARATUS FOR SCANNING ACCESS POINT IN WIRELESS LAN SYSTEM

(71) Applicant: Samsung Electronics Co., Ltd., Suwon-si (KG)

(72) Inventors: Ha-Kyung Jung, Seoul (KR); Han-Na Lim, Seoul (KR); Beom-Sik Bae, Suwon-si (KR); Jin-Sung Lee, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 62 days.

(21) Appl. No.: 14/815,242

(22) Filed: Jul. 31, 2015

(65) Prior Publication Data

US 2016/0037444 A1    Feb. 4, 2016

(30) Foreign Application Priority Data

Jul. 31, 2014   (KR) .......................... 10-2014-0098353

(51) Int. Cl.
*H04W 48/16* (2009.01)
*H04W 52/02* (2009.01)
(Continued)

(52) U.S. Cl.
CPC ....... *H04W 48/16* (2013.01); *H04W 52/0203* (2013.01); *H04W 48/14* (2013.01);
(Continued)

(58) Field of Classification Search
CPC ..... H04W 84/12; H04W 88/06; H04W 88/08; H04W 48/20; H04W 36/08; H04W 48/16; H04W 52/0203
See application file for complete search history.

(56) References Cited

U.S. PATENT DOCUMENTS 7,844,269 B2   11/2010   Abdel-Kader
8,619,674 B1   12/2013   Shipley et al.
(Continued)

FOREIGN PATENT DOCUMENTS

KR   10-2009-0030691 A   3/2009
KR   10-2014-0028492 A   3/2014
(Continued)

OTHER PUBLICATIONS

Intel Corporation, 3GPP TSG-RAN WG2 Meeting #82, R2-132034, "WLAN scanning power consumption benchmarks"WLAN scanning power consumption benchmarks, May 20, 2013.
(Continued)

*Primary Examiner* — Noel Beharry
*Assistant Examiner* — Nicole King
(74) *Attorney, Agent, or Firm* — McAndrews, Held & Malloy, Ltd.

(57) ABSTRACT

The present disclosure relates to obtaining AP information or information on a channel where the AP is positioned from a neighboring mobile terminal that has recently performed AP scanning and re-attempting to scan based on the obtained information. According to an embodiment of the present disclosure, a method for scanning an access point (AP) in a wireless local area network (LAN) system comprises performing first WLAN scanning by a first mobile terminal, transmitting a request for WLAN AP information to a second mobile terminal that has previously performed WLAN AP scanning, receiving the WLAN AP information from the second mobile terminal, and performing second WLAN scanning based on the WLAN AP information.

22 Claims, 10 Drawing Sheets

(51) Int. Cl.
*H04W 84/12* (2009.01)
*H04W 48/14* (2009.01)
*H04W 48/20* (2009.01)
*H04W 76/02* (2009.01)

(52) U.S. Cl.
CPC .......... *H04W 48/20* (2013.01); *H04W 76/023* (2013.01); *H04W 84/12* (2013.01); *Y02B 60/50* (2013.01)

(56) References Cited

U.S. PATENT DOCUMENTS

| | | | |
|---|---|---|---|
| 2004/0052232 A1 | 3/2004 | Ramaswamy et al. | |
| 2004/0203873 A1 | 10/2004 | Gray | |
| 2004/0249977 A1 | 12/2004 | Minamisawa | |
| 2005/0030922 A1 | 2/2005 | Lee et al. | |
| 2006/0200862 A1* | 9/2006 | Olson | H04L 63/1433 726/23 |
| 2010/0039992 A1 | 2/2010 | Prakash et al. | |
| 2011/0222523 A1 | 9/2011 | Fu et al. | |
| 2012/0026993 A1 | 2/2012 | Radpour | |
| 2012/0128090 A1 | 5/2012 | Seok | |
| 2012/0133555 A1 | 5/2012 | Hyun | |
| 2012/0157115 A1 | 6/2012 | Jeong | |
| 2012/0209732 A1 | 8/2012 | Jeong | |
| 2013/0012229 A1* | 1/2013 | Itagaki | G01S 5/14 455/456.1 |
| 2013/0182697 A1 | 7/2013 | Tuominen et al. | |
| 2013/0242838 A1* | 9/2013 | Montemurro | H04W 48/16 370/311 |
| 2014/0010157 A1 | 1/2014 | Hsieh | |
| 2014/0185605 A1* | 7/2014 | Oh | H04W 48/16 370/338 |
| 2014/0328254 A1 | 11/2014 | Lim | |
| 2015/0351010 A1* | 12/2015 | Kumar | H04W 48/16 455/434 |
| 2016/0007386 A1* | 1/2016 | Park | H04W 48/14 370/329 |

FOREIGN PATENT DOCUMENTS

| | | |
|---|---|---|
| WO | WO10140742 | 12/2010 |
| WO | WO12162976 | 12/2012 |
| WO | WO13052653 | 4/2013 |
| WO | 2013/089526 A1 | 6/2013 |

OTHER PUBLICATIONS

International Search Report corresponding to International Application No. PCT/KR2015/007950, Nov. 11, 2015.
Written Opinion of the International Searching Authority corresponding to International Application No. PCT/KR2015/007950, Nov. 11, 2015.
Categorizing WLAN scanning/discovery assistance, R2-132021, section 2.2, 3GPP TSG-RAN WG2 #82, May 20-24, 2013.

* cited by examiner

METHOD AND APPARATUS FOR SCANNING ACCESS POINT IN WIRELESS LAN SYSTEM

CROSS-REFERENCE TO RELATED APPLICATION(S)

This application claims the benefit under 35 U.S.C. § 119(a) of a Korean patent application filed in the Korean Intellectual Property Office on Jul. 31, 2014 and assigned Serial No. 10-2014-0098353, the entire disclosure of which is incorporated herein by reference.

TECHNICAL FIELD

The present disclosure concerns methods and apparatuses for scanning access points in wireless LAN systems.

BACKGROUND

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on ultrahigh frequency bands (mmWave), such as, e.g., 60 GHz. To mitigate path loss on the ultrahigh frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, a diversity of radio communication techniques is in development by the growing information communication technology. Among others, the wireless local area network (WLAN) system enables wireless access to the Internet in a home, business, or an area offering a particular service through a personal digital assistant (PDA), a laptop computer, a portable multimedia player (PMP), or other portable terminals (hereinafter, referred to as a "WLAN terminal") based on radio frequency technology.

A mobile terminal equipped with a WLAN interface scans ambient accessible WLAN access points (APs) while the WLAN interface stays on.

The scanning comes in two ways.

The first method is passive scanning.

In the passive scanning method, an AP periodically broadcasts beacon frames to the mobile terminal. Passive scanning consumes much more time than active scanning does for hearing and thus passive scanning consumes ten times more power than active scanning. In the case of passive scanning, the AP normally has a beacon period of 100 ms.

The second method is active scanning.

In the active scanning method, when a mobile terminal sends a request, an AP responds to the request. For active scanning, about 10 ms is required to scan one channel.

Such time gap causes passive scanning to consume much more power than active scanning.

As such, the wireless scanning process takes a long time, and the scanning process results in increased power consumption.

The above information is presented as background information only to assist with an understanding of the present disclosure. No determination has been made, and no assertion is made, as to whether any of the above might be applicable as prior art with regard to the present disclosure.

SUMMARY

According to the present disclosure, there are provided a scanning method and apparatus for a WLAN AP.

According to the present disclosure, there are provided a method and apparatus for minimizing power consumption caused by performing scanning on a WLAN AP.

According to an embodiment of the present disclosure, a method for scanning an access point (AP) by a first mobile terminal in a wireless local area network (LAN) system comprises transmitting a request for WLAN AP information to a second mobile terminal positioned adjacent to the first mobile terminal, obtaining the WLAN AP information from the second mobile terminal, and performing WLAN scanning based on the WLAN AP information, wherein a number of channels where the WLAN scanning is performed is smaller than a number of all channels for the AP scanning.

According to an embodiment of the present disclosure, an apparatus for scanning an access point (AP) by a first mobile terminal in a wireless local area network (LAN) system comprises a controller configured to identify the total number of channels for the AP scanning, to send a request for WLAN AP information to a second mobile terminal positioned adjacent to the first mobile terminal, to obtain the WLAN AP information from the second mobile terminal, and to perform WLAN scanning based on the WLAN AP information, wherein a number of channels where the WLAN scanning is performed is smaller than a number of all channels for the AP scanning.

According to an embodiment of the present disclosure, a method for scanning an access point (AP) by a second mobile terminal in a wireless local area network (LAN) system comprises receiving a request for WLAN AP information from a neighboring first mobile terminal, and transmitting the WLAN AP information to the first mobile terminal, wherein the WLAN AP information determines a WLAN scanning operation by the first mobile terminal, and wherein a number of channels where the WLAN scanning operation is performed is smaller than a number of all channels for the AP scanning.

According to an embodiment of the present disclosure, an apparatus for scanning an access point (AP) by a second mobile terminal in a wireless local area network (LAN) system comprises a controller configured to receive a request for WLAN AP information from a neighboring first mobile terminal and to transmit the WLAN AP information to the first mobile terminal, wherein the WLAN AP information determines a WLAN scanning operation by the first mobile terminal, and wherein a number of channels where the WLAN scanning operation is performed is smaller than a number of all channels for the AP scanning.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

Throughout the drawings, it should be noted that like reference numbers are used to depict the same or similar elements, features, and structures, wherein.

Throughout the drawings, like reference numerals will be understood to refer to like parts, components, and structures.

DETAILED DESCRIPTION

Hereinafter, embodiments of the present disclosure are described in detail with reference to the accompanying drawings. The same reference denotations may be used to refer to the same or similar elements throughout the specification and the drawings. When making the gist of the present disclosure unclear, the detailed description of known functions or configurations is skipped.

The terms or language used herein should not be interpreted as limited as typical ones or ones defined in the dictionary but rather to comply with the technical spirit of the present disclosure based on the doctrine that the inventor may define terms on his own in a proper manner so as to make the invention understood in a best way to describe best the invention.

Figure 1:
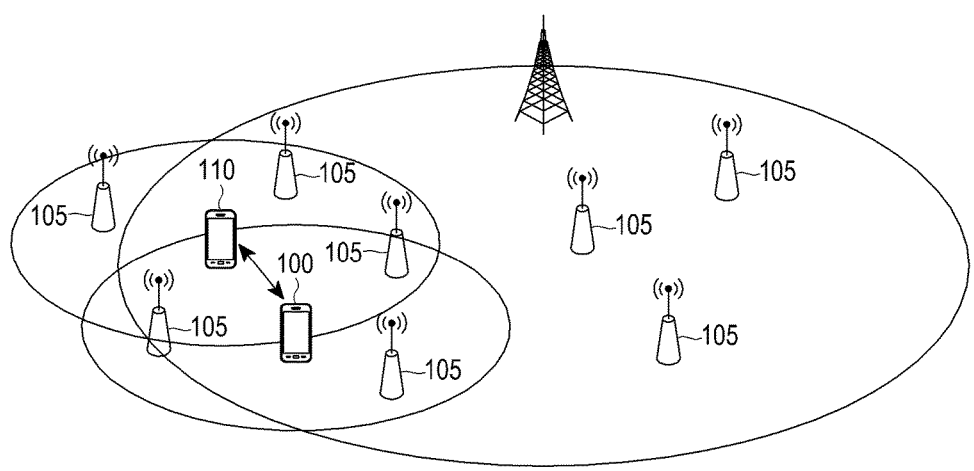
FIG. 1 is a view illustrating an arrangement of a terminal to initiate scanning a WLAN AP and a mobile terminal that has already scanned a WLAN AP adjacent to the terminal according to an embodiment of the present disclosure.

FIG. 1 is a view illustrating an arrangement of a terminal to initiate scanning a WLAN AP and a mobile terminal that has already scanned a wireless local area network (WLAN) access points (AP) adjacent to the terminal according to an embodiment of the present disclosure.

Referring to FIG. 1, a first mobile terminal 110, having a communication coverage, moves from a position to a position as shown in FIG. 1 to perform a scanning procedures on nearby (or neighboring) wireless local area network (WLAN) access points (APs) 105.

Meanwhile, a second mobile terminal 100 is positioned adjacent to the first mobile terminal 110, i.e., within the communication coverage of the first mobile terminal 110. The second mobile terminal 100 is assumed to perform the WLAN AP scanning procedure intended to be conducted by the first mobile terminal 110 to store a result thereof. In this case, according to an embodiment of the present disclosure, the first mobile terminal 110, before performing the WLAN AP scanning procedure that consumes a considerable WLAN scanning time and energy, sends an inquiry about the result of the WLAN AP scanning procedure to the second mobile terminal 100 and obtains a response therefrom, thereby shortening or omitting the WLAN AP scanning procedure.

Figure 2:
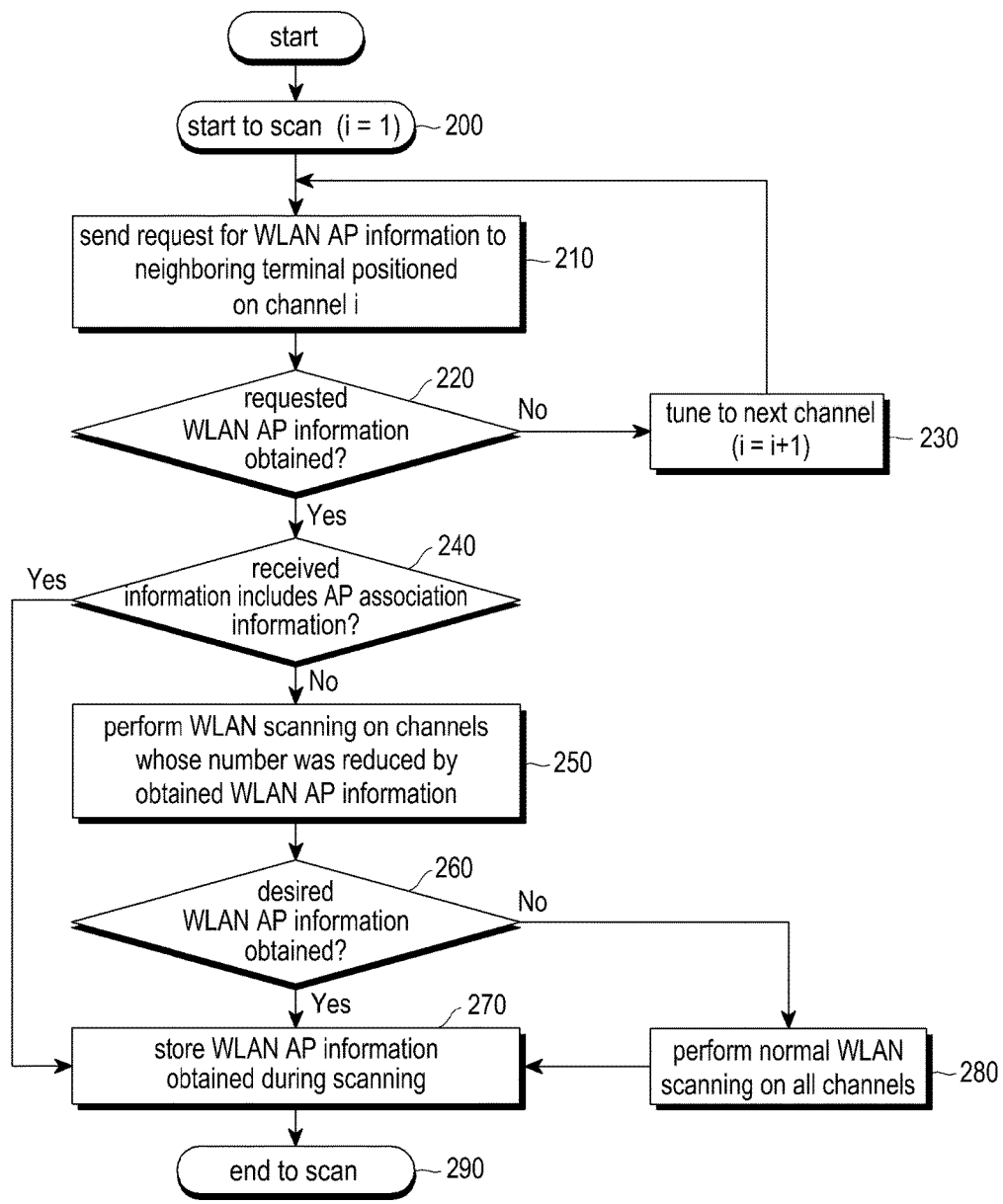
FIG. 2 is a flowchart illustrating a brief operating process of a mobile terminal according to an embodiment of the present disclosure.

FIG. 2 is a flowchart illustrating a WLAN AP scanning process of a mobile terminal according to an embodiment of the present disclosure.

In the WLAN AP scanning process described in connection with FIG. 2, when there are N available WLAN channels (from channel 1 to channel N), it is assumed that a mobile terminal (e.g., the mobile terminal 110) sequentially scans the N WLAN channels (from channel 1 to channel N). Such sequence may exactly correspond to the channel numbers defined in, e.g., Institute of electrical and electronics engineers (IEEE) 802.11, but may also be logical channel numbers sorted in descending order of the chance that there is a WLAN AP by an enhanced mobile terminal implementation.

The first mobile terminal 110 initiates a WLAN AP scanning process in operation 200, and sets a scanning index (e.g., i) to 1. The first mobile terminal 110 sends a request for WLAN AP information to a neighboring mobile terminal positioned on i-th channel, and waits for a response in operation 210. In some embodiments, the request may include filtering conditions. Specifically, the filtering conditions may include one or more APs of interest with respect to the first mobile terminal 110 among APs covered by the second mobile terminal 100. The second mobile terminal 100 may respond in a variety of ways. For example, in some embodiments, the second mobile terminal 100 may provide WLAN AP information, or the channel information, that contains a channel, or a channel list, of an AP of interest with respect to the first mobile terminal 110 is located. In other embodiments, the second mobile terminal 100 may include in the WLAN AP information, or the channel information, content corresponding to overall information of a beacon frame. In still other embodiments, the second mobile terminal 100 may include in the WLAN AP information, or the channel information probe, response frame transmitted from the AP of interest. The channel information may also include at least one of an address of the AP, a service set identifier (SSID), and a media access control (MAC) address of the AP. Further, the WLAN AP information may include AP capability information or a channel number.

In operation 220, when a predetermined timer expires, the first mobile terminal 110 determines whether the requested AP information from the second mobile terminal 100, a neighboring mobile terminal, has been obtained. If it is determined the requested AP information from the second mobile terminal 100 has been obtained, the first mobile terminal 110 goes to operation 240, otherwise to operation 230.

In operation 230, the first mobile terminal 110 changes or tunes the WLAN channel to a next channel and goes to operation 210 to send again a request for WLAN AP information to the neighboring mobile terminal of the next channel.

In operation 240, the first mobile terminal 110 identifies whether the information on the WLAN AP obtained from the neighboring mobile terminal has enough information to attempt association or immediate access to the WLAN AP. In some embodiments, the information provided from the second mobile terminal 100 may be a number of the WLAN channel where the AP is present. In other embodiments, the information provided from the second mobile terminal 100 may be a list of a plurality of channels to reduce the amount of data transmitted. In still other embodiments, the information provided from the second mobile terminal 100 may include contents (e.g., the version of standard supported, data rate, or SSID) of the beacon frame or probe response frame transmitted from the AP. When the information is not enough to attempt access or association to the WLAN AP, the first mobile terminal 110 goes to operation 250. When the information is enough to attempt access or association to the WLAN AP), the first mobile terminal 110 goes to operation 270 to store the obtained WLAN AP information together with the time obtained (e.g., a time stamp) in a memory (not shown) to respond to a future request for WLAN AP information sent from another neighboring mobile terminal to the first mobile terminal 110.

In operation 250, the first mobile terminal 110 scans, actively or passively, on the channel obtained from the neighboring mobile terminal for a probe response or beacon frame from the AP. In some embodiments, since the number of channels provided by the neighboring mobile terminal is generally much less than the total number N of channels available, the neighboring mobile terminal may significantly reduce the overall WLAN AP scanning time.

In operation 260, the first mobile terminal 110 determines whether information enabling access or association to a desired AP has been obtained as a result of the active scanning or passive scanning procedure. In most cases, the first mobile terminal 110 may obtain the information enabling access or association to the desired AP through active scanning or passive scanning. However, after the neighboring mobile terminal obtains the AP information, as time elapses, the AP information may be varied (e.g., the AP's operation channel is varied or AP's traffic load is increased). As a result, the first mobile terminal 110 might fail to obtain the information on the desired AP. When obtaining the information that enables access or association to the desired AP, the first mobile terminal 110 goes to operation 270 to store the obtained WLAN AP information together with the time obtained in the memory to respond to a future request for WLAN AP information sent from another neighboring mobile terminal.

When failing to obtain the information enabling access or association to the desired AP in operation 260, the first mobile terminal 110 goes to operation 280 to perform a normal scanning process on all the channels. The first mobile terminal 110 stores the result of the process together with the WLAN AP information obtained in operation 270 in the memory to respond to a future request for WLAN AP information sent from another neighboring mobile terminal.

In operation 290, the terminal terminates the scanning process, followed by an access or association procedure.

Figure 3:
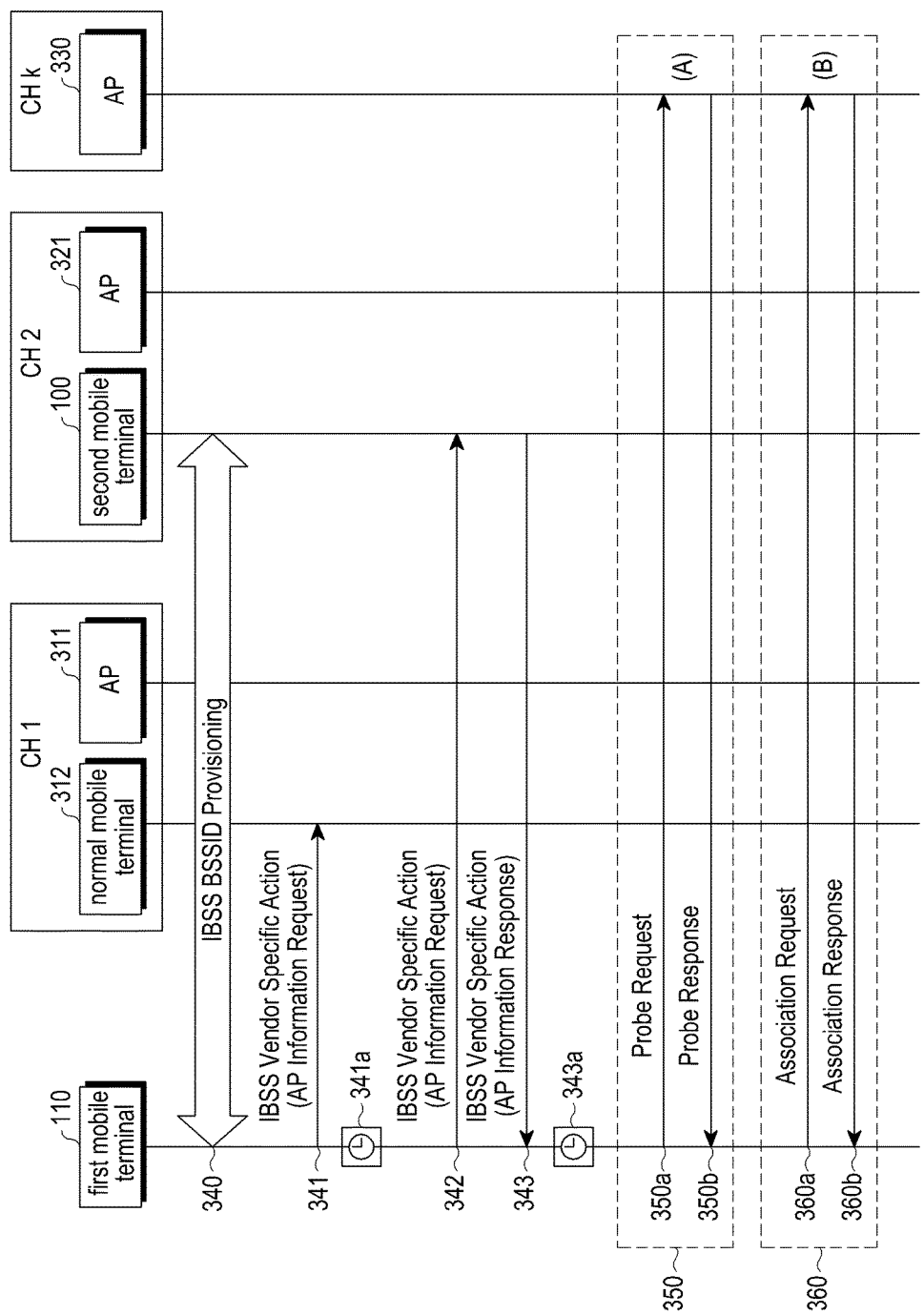
FIG. 3 is a flowchart illustrating a process for obtaining information on a WLAN AP from a neighbor mobile terminal using an independent basic service set (IBSS) mode vendor specific action frame of a WLAN.

FIG. 3 is a flowchart illustrating a process for obtaining information on a WLAN AP from a neighbor mobile terminal using an independent basic service set (IBSS) mode vendor specific action frame of a WLAN.

It is assumed that there are a plurality of mobile terminals and APs adjacent to the first mobile terminal 110. It is assumed that a mobile terminal 312 and an AP 311 are not implemented with a function according to the present disclosure are present on WLAN channel 1. It is also assumed that a mobile terminal 100 (e.g., the second mobile terminal 100 of FIG. 1) and an AP 321 that are implemented with an embodiment of the present disclosure are present on WLAN channel 2. Further, it is assumed that an AP 330 intended to be accessed by the first mobile terminal 110 is present on channel k.

Although FIG. 3 shows that each of channel 1 and channel 2 includes one terminal and one AP, each of the channels may include a plurality of mobile terminals and/or APs in other embodiments. Further, channel k may indicate any channel where a desired AP to be accessed by the first mobile terminal 110. In some embodiments, channel k may also be the same as channel 1 or channel 2. In other embodiments, channel k may also be a group of multiple channels, rather than a single channel.

The first mobile terminal 110 intending to scan WLAN APs via an ambient mobile terminal determines a common IBSS basic service set identifier (BSSID) for direct communication with the ambient mobile terminal, without involvement by the WLAN AP. In some cases, a typical mobile terminal arbitrarily determines a BSSID and broadcasts the same via typical WLAN inter-terminal direct communication (e.g., Adhoc communication). However, this is time-consuming. Rather, a scheme to use previous provisioning of a BSSID upon requesting AP information between mobile terminals using over the air (OTA) provisioning is disclosed. The message exchange in the OTA provisioning procedure may be conducted using messages specified in relevant standards, such as open mobile alliance device management (OMA DM) and transport layer security (TLS), and this is described below in further detail with reference to FIG. 5.

Figure 5:
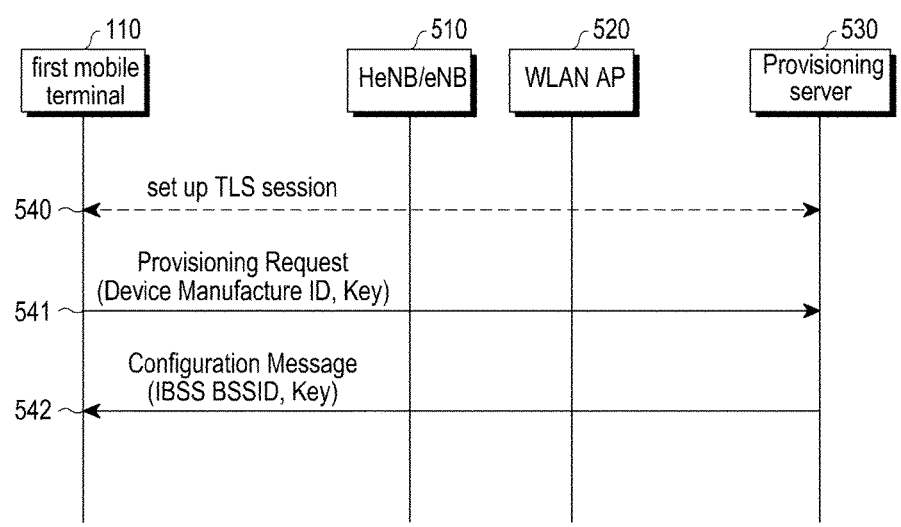
FIG. 5 is a flowchart illustrating an IBSS basic service set identifier BSSID provisioning process corresponding to operation 340 of FIG. 3 and operation 440 of FIG. 4.

Specifically, as shown in FIG. 5, the first mobile terminal 110 performs IBSS BSSID provisioning with the second mobile terminal 100 in operation 340.

The first mobile terminal 110 broadcasts an IBSS mode vendor specific action frame (e.g., Type: 00, Subtype: 1101) including an AP information request to the second mobile terminal 100 of channel 2 in operation 340. In this case, the BSSID of this frame uses the BSSID of the IBSS provisioned in operation 340.

The vendor specific action frame in operation 341 is a broadcast-type frame, thus causing a potential overhead from all ambient mobile terminals receiving the same responses. In operation 342, after a predetermined amount of time as determined in operation 341a, the neighboring mobile terminal or the second mobile terminal 100 receives the broadcast frame. In some embodiments, two or more schemes are available to minimize the size and number of broadcast messages to be additionally generated.

For example, in a first scheme, transmit power is limited so that neighboring mobile terminals positioned near the first mobile terminal 110 only may receive an AP Information Request. For transmitting an AP Information Request within a WLAN, a transmit power limiting rule for non-licensed bands is typically used to limit the maximum transmit power. By limiting the transmit power to be less than the maximum transmit power, only the very close neighboring mobile terminals may receive the AP Information Request. Thus, no response to an AP Information Request from any mobile terminal may be attributed to excessive low transmit power. Accordingly, higher transmit power may be used to broadcast a next AP Information Request.

Further, in a second scheme, an AP Information Request containing a filtering condition is broadcast so that only neighboring mobile terminals meeting the filtering condition may respond to the AP Information Request. The filtering condition may contain one or more of the following:

Elapsed time after scanning: A WLAN AP may vary parameters such as operation channels depending on variations in ambient radio environments, so as to prevent a neighboring mobile terminal from responding after a predetermined amount of time has elapsed.

Channel number or channel range: This allows for receiving responses from only neighboring mobile terminals that have AP information corresponding to a particular channel or channel range that the first mobile terminal 110 may need.

Reception signal strength threshold: This allows for receiving a response from only neighboring mobile terminals that have a reception strength of AP Information Request higher than a predefined threshold. Thus, only neighboring mobile terminals positioned close to the first mobile terminal 110 (thus having higher reception strength) may respond.

Particular address: This allows for receiving a response from only neighboring mobile terminals that has AP information with a particular address (e.g., an SSID, BSSID, ESSID, or homogenous extended service set ID (HESSID)) or a prefix of an address.

BSS Load threshold: This allows for receiving a response from only neighboring mobile terminals that have AP information whose BSS load is larger than a predefined threshold.

Backhaul rate threshold: This allows for receiving a response from only neighboring mobile terminals that have AP information whose backhaul rate is larger than a predefined threshold.

AP capability: This allows for receiving a response from only neighboring mobile terminals that have AP information with a particular capability (e.g., a very high throughput (VHT) capability).

Sorting reference: This informs a sorting reference metric when a neighboring mobile terminal responds with a plurality of AP information.

As such, the first mobile terminal 110 broadcasts an IBSS mode vendor specific action frame including the AP Information Request on channel 1 and then waits to respond in operation 341. Since there are no terminals where an embodiment of the present disclosure is implemented on channel 1, a response may not be obtained. After a predetermined time elapses, the first mobile terminal 110 terminates the operation on channel 1.

In operation 342, the first mobile terminal 110 broadcasts an IBSS mode vendor specific action frame including an AP Information Request on a next channel (e.g., channel 2). When receiving the same, the second mobile terminal 100 responds with an IBSS mode vendor specific action frame containing an AP Information Response in operation 343. The vendor specific action frame may be of broadcast type or unicast type. When the vendor specific action frame is implemented as a broadcast type, another requesting mobile terminal receiving the AP information response may not need to transmit the AP information request.

The AP information response may come in two types.

A first type of AP information response may be a WLAN channel number, or a list of a plurality of channels, where an AP meeting the filtering condition included in the AP information request is present.

A second type of AP information response may include content of the beacon response frame or probe response frame (e.g., version of supported standard, data rate, or SSID) that has been transmitted by the AP meeting the filtering condition included in the AP information request.

As in operation 343a, when the AP information response contains a WLAN channel number or a list of multiple channels after a predetermined time, the first mobile terminal 110 actively or passively scans the channel or the list of channels in operation 350.

When the AP information response contains the content of the beacon response frame or probe response frame previously transmitted by the AP, the first mobile terminal 110 does not need additional active or passive scanning. As a result, the first mobile terminal 110 attempts an access or association procedure in operation 360.

Meanwhile, although not directly shown in FIG. 3, when a remaining battery power of the second mobile terminal 100 is low after receiving an AP information request, the second mobile terminal 100 may not respond with an AP information response in order to save power.

Figure 4:
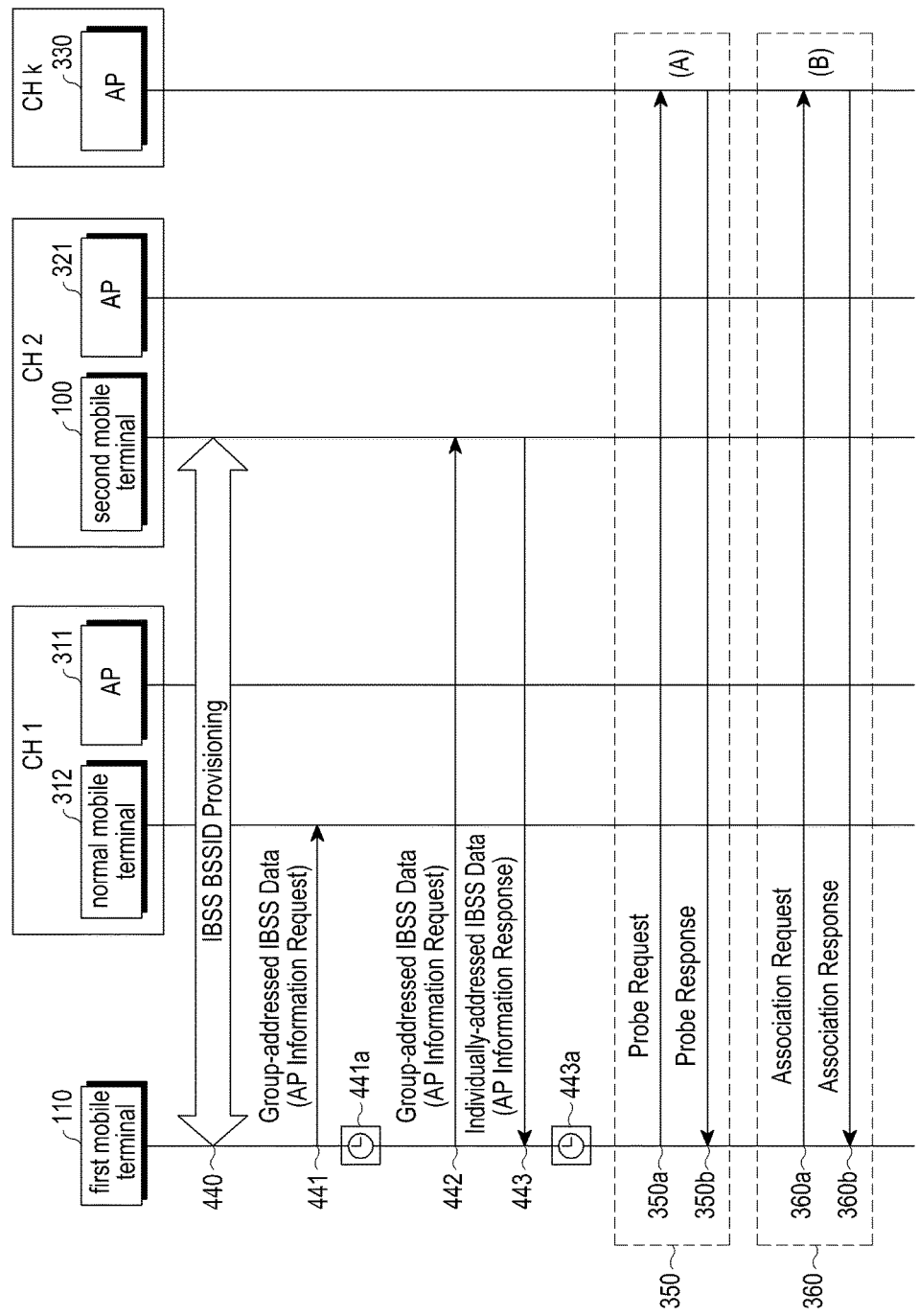
FIG. 4 is a flowchart illustrating a process for obtaining information on a WLAN AP from a neighbor mobile terminal using an IBSS mode data frame of a WLAN.

FIG. 4 is a flowchart illustrating a process for obtaining information on a WLAN AP from a neighbor mobile terminal using an IBSS mode data frame of a WLAN.

It is assumed that there are a plurality of mobile terminals and APs adjacent to the first mobile terminal 110. It is assumed that a mobile terminal 312 and an AP 311 that are not implemented with a function according to the present disclosure are present on WLAN channel 1. It is also assumed that a second mobile terminal 100 (e.g., the second mobile terminal 100 of FIG. 1) and an AP 321 that are implemented with an embodiment of the present disclosure are present on WLAN channel 2. Further, it is assumed that an AP 330 intended to be accessed by the first mobile terminal 110 is present on channel k.

Although FIG. 4 shows that each of channel 1 and channel 2 includes one terminal and one AP, each of the channels may include a plurality of mobile terminals and/or APs in other embodiments. Further, channel k may indicate any channel where a desired AP to be accessed by the first mobile terminal 110. In some embodiments, channel k may also be the same as channel 1 or channel 2. In other embodiments, channel k may also be a group of multiple channels, rather than a single channel.

The first mobile terminal 110 intending to scan WLAN APs via an ambient mobile terminal determines a common IBSS basic service set identifier (BSSID) for direct communication with the ambient mobile terminal, without involvement by the WLAN AP. In some cases, a typical mobile terminal arbitrarily determines a BSSID and broadcasts the same via typical WLAN inter-terminal direct communication (e.g., Adhoc communication). However, this is time-consuming. Rather, a scheme to use previous provisioning of a BSSID upon requesting AP information between mobile terminals using over the air (OTA) provisioning is disclosed. The message exchange in the OTA provisioning procedure may be conducted using messages specified in relevant standards, such as open mobile alliance device management (OMA DM) and transport layer security (TLS), and this is described below in further detail with reference to FIG. 5.

The first mobile terminal 110 performs IBSS BSSID provisioning with the second mobile terminal 100 in operation 440.

In operation 441, an IBSS mode data frame (e.g., type: 10) including an AP information request is broadcast on channel 1. In this case, the BSSID of this frame uses the BSSID of the IBSS provisioned in operation 340.

The IBSS mode data frame in operation 441 is a broadcast-type frame, thus causing a potential overhead from all ambient mobile terminals receiving the same responses. After the neighboring mobile terminal receives the broadcast frame, the present disclosure proposes two schemes to minimize the size and number of messages to be additionally generated.

For example, in a first scheme, transmit power is limited so that neighboring mobile terminals positioned near the first mobile terminal 110 only may receive an AP Information Request. For transmitting an AP Information Request within a WLAN, a transmit power limiting rule for non-licensed bands is typically used to limit the maximum transmit power. By limiting the transmit power to be less than the maximum transmit power, only the very close neighboring mobile terminals may receive the AP Information Request. Thus, no response to an AP Information Request from any mobile terminal may be attributed to excessive low transmit power. Accordingly, higher transmit power may be used to broadcast a next AP Information Request.

Further, in a second scheme, an AP Information Request containing a filtering condition so that only neighboring mobile terminals meeting the particular condition may respond to the AP Information Request. The filtering condition may contain one or more of the following:

Elapsed time after scanning: A WLAN AP may vary parameters such as operation channels depending on variations in ambient radio environments, so as to prevent a neighboring mobile terminal from responding after a predetermined amount of time has elapsed.

Channel number or channel range: This allows for a response from only neighboring mobile terminals that have AP information corresponding to a particular channel or channel range in which the first mobile terminal 110 may need.

Reception signal strength threshold: This allows for receiving a response from only neighboring mobile terminals having a reception strength of AP Information Request higher than a predefined threshold. Thus, only neighboring mobile terminals positioned close to the first mobile terminal 110 (thus having higher reception strength) may respond.

Particular address: This allows for receiving a response from only neighboring mobile terminals that have a particular address (e.g., a service set identification (SSID), basic service set identification (BSSID), extended service set identification (ESSID), or homogeneous extended service set ID (HESSID)) or a prefix of an address.

BSS Load threshold: This allows for receiving a response from only neighboring mobile terminals that AP information whose BSS load is larger than a predefined threshold.

Backhaul rate threshold: This allows for receiving a response from only neighboring mobile terminals that have AP information whose backhaul rate is larger than a predefined threshold.

AP capability: This allows for receiving a response from only neighboring mobile terminals that have AP information with a particular capability (e.g., VHT capability).

Sorting reference: This informs a sorting reference metric when a neighboring mobile terminal responds with a plurality of AP information.

As such, the first mobile terminal 110 broadcasts an IBSS mode data frame including the AP Information Request on channel 1 and then waits to respond in operation 441. Since there are no terminals where the content of the present disclosure is implemented on channel 1, a response may not be obtained, no respond might be obtained. After a predetermined time elapses, the first mobile terminal 110 terminates the operation on channel 1.

In operation 442, the first mobile terminal 110 broadcasts an IBSS mode data frame including an AP Information Request on a next channel (channel 2) after a predetermined time as in operation 441a. When receiving the same, the second mobile terminal 100 responds with an IBSS mode vendor specific data frame containing an AP Information Response in operation 443. The IBSS mode vendor specific data frame may be of broadcast type or unicast type. When the IBSS mode vendor specific data frame is implemented as a broadcast type, another requesting mobile terminal receiving the AP information response may not need to transmit the AP information request.

The AP information response greatly comes in two types.

A first type of AP information response may be a WLAN channel number, or a list of a plurality of channels, where an AP meeting the filtering condition included in the AP information request is present.

A second type of AP information response may include content of the beacon response frame or probe response frame (e.g., version of supported standard, data rate, or SSID) that has been transmitted by the AP meeting the filtering condition included in the AP information request.

As in operation 443a, when the AP information response contains a WLAN channel number, or a list of multiple channels after a predetermined time, the first mobile terminal 110 actively or passively scans the channel or the list of channels in operation 350.

When the AP information response contains the content of the beacon response frame or probe response frame previously transmitted by the AP, the first mobile terminal 110 does not need additional active or passive scanning. As a result, the first mobile terminal 110 attempts an access or association procedure in operation 360.

Meanwhile, although not directly shown in FIG. 4, when the remaining battery power of the second mobile terminal 100 is low after receiving the AP information request, the second mobile terminal 100 may not respond with an AP information response in order to save power.

FIG. 5 is a flowchart illustrating an IBSS BSSID provisioning process corresponding to operation 340 of FIG. 3 and operation 440 of FIG. 4.

The first mobile terminal 110 intending to scan WLAN APs via an ambient mobile terminal first determines a common IBSS basic service set identifier (BSSID) for direct communication with the ambient mobile terminal, without involvement by the WLAN AP. Although in a typical WLAN inter-terminal direct communication (e.g., Adhoc communication), only one mobile terminal arbitrarily determines a BSSID to broadcast, this approaches is time-consuming. Accordingly, in an embodiment of the present disclosure, previous provisioning of a BSSID upon requesting AP information between terminals using OTA provisioning may be used.

Message exchange in the OTA provisioning procedure may be conducted using relevant protocols such as OMA DM and transport layer security (TLS).

In operation 540, which is optional, when provisioning messages are exchanged using a TLS communication protocol, a TLS session establishment process between the first mobile terminal 110 and a provisioning server 530 may be performed. The detailed TLS session establishment procedure is well known to one of ordinary skill in the art, and thus, no further detailed description thereof is given.

In operation 541, the first mobile terminal 110 transfers, to the provisioning server 530, a provisioning request message for requesting to provision an IBSS BSSID. The provisioning request message may selectively include a device manufacturer ID and an authentication key.

The provisioning server 530 transfers a configuration message to the first mobile terminal 110 in operation 542. The configuration message may contain an IBSS BSSID for Adhoc communication between mobile terminals and may optionally include, e.g., an authentication key.

Figure 6:
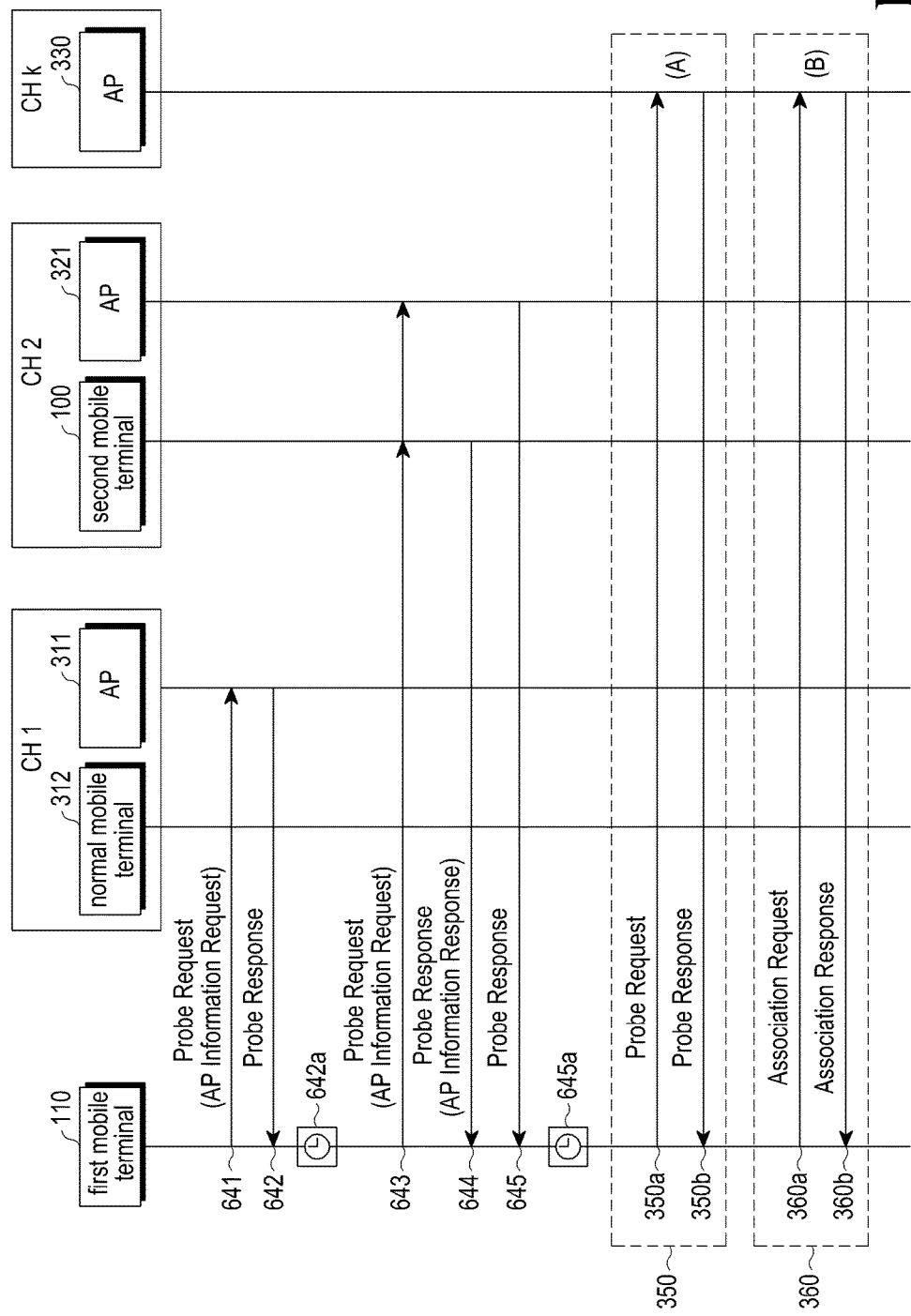
FIG. 6 is a flowchart illustrating a process for obtaining information on a WLAN AP from a neighbor mobile terminal using a probe request/probe response frame of a WLAN.

FIG. 6 is a flowchart illustrating a process for obtaining information on a WLAN AP from a neighbor mobile terminal using a probe request/probe response frame of a WLAN.

It is assumed that there are a plurality of mobile terminals and APs adjacent to the first mobile terminal 110. It is assumed that a mobile terminal 312 and an AP 311 that are not implemented with a function according to the present disclosure are present on WLAN channel 1. It is also assumed that a second mobile terminal 100 (e.g., the second mobile terminal 100 of FIG. 1) and an AP 321 that are implemented with an embodiment of the present disclosure are present on WLAN channel 2. Further, it is assumed that an AP 330 intended to be accessed by the first mobile terminal 110 is present on channel k.

Although FIG. 6 shows that each of channel 1 and channel 2 includes one terminal and one AP, each of the channels may include a plurality of mobile terminals and/or APs in other embodiments. Further, channel k may indicate any channel where a desired AP to be accessed by the first mobile terminal 110. In some embodiments, channel k may also be the same as channel 1 or channel 2. In other embodiments, channel k may also be a group of multiple channels, rather than a single channel.

In operation 641, a probe request frame (e.g., type: 00, subtype: 0100) including an AP information request is broadcast on channel 1. In this case, the AP information request is transferred using the vendor specific field of the probe request.

After receiving the broadcast frame, the AP 311 may not respond to the AP information request. However, as in operation 642, the AP 311 transmits an AP information response as a message responding to the AP information request.

Although not directly shown in FIG. 6, after receiving the broadcast frame, the mobile terminal 312 might not respond to the AP information request. However, as in operation 642, the mobile terminal 312 may transmit an AP information response as a message responding to the AP information request.

After a predetermined amount of time has elapsed in operation 642a, the first mobile terminal 110 receiving the AP information response, when the AP information response does not contain the desired AP information, broadcasts a probe request frame (e.g., type: 00, subtype: 0100) including an AP information request on channel 2 in operation 643. In this case, the AP information request is transferred using the vendor specific field of the probe request.

After receiving the broadcast frame, the second mobile terminal 100 might not respond to the AP information request. However, as in operation 644, the second mobile terminal 100 may transmit an AP information response as a message responding to the AP information request.

After receiving the broadcast frame, the AP 321 might not respond to the AP information request. However, as in operation 645, the AP 321 may transmit an AP information response as a message responding to the AP information request.

When the AP information response contains a WLAN channel number or list of multiple channels after a predetermined time (operation 645a), the first mobile terminal 110 performs active scanning or passive scanning on the channel or multiple channels in operation 350.

When the AP information response contains the content of the beacon/probe response frame previously transmitted by the AP, the first mobile terminal 110 does not need additional active scanning or passive scanning procedure, and thus, the first mobile terminal 110 attempts an access or association procedure in operation 360.

Figure 7:
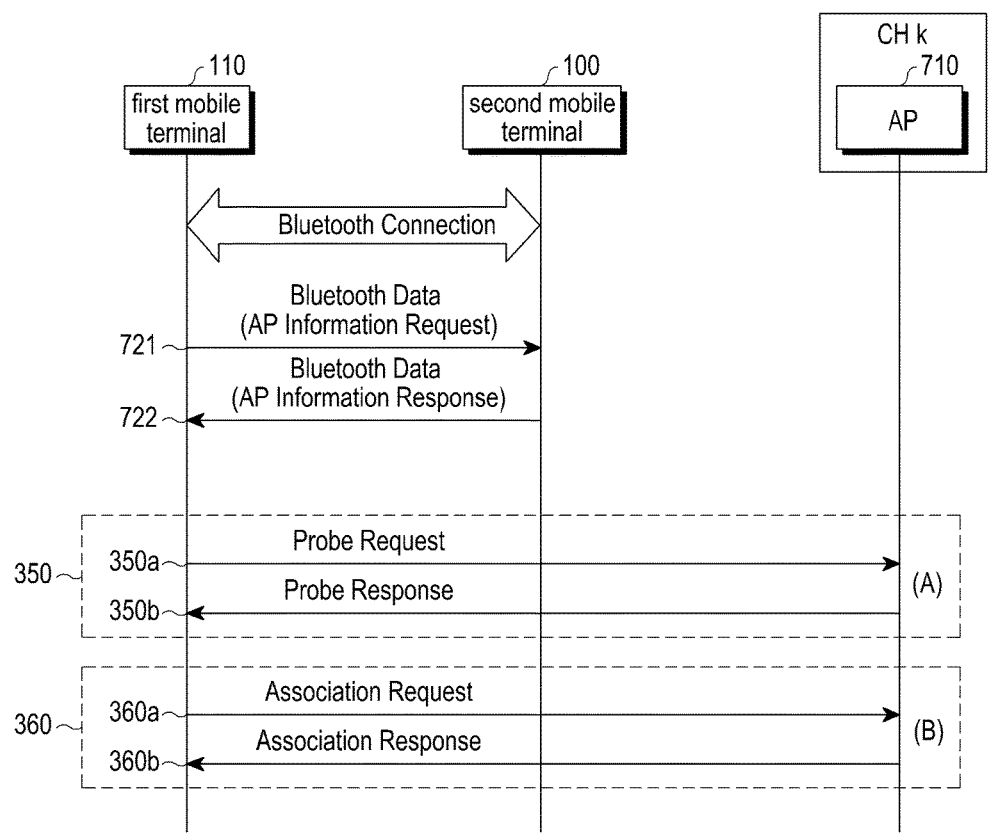
FIG. 7 is a flowchart illustrating a method for scanning an AP in a wireless LAN system according to an embodiment of the present disclosure.

FIG. 7 is a flowchart illustrating a method for scanning an AP in a wireless LAN system according to an embodiment of the present disclosure.

The first mobile terminal 110 makes a Bluetooth connection with the second mobile terminal 100.

When the Bluetooth connection is made, the first mobile terminal 110 transmits an AP information request message to the second mobile terminal 100 through Bluetooth data in operation 721. The second mobile terminal 100 transmits an AP information response message through Bluetooth data. The AP information response message contains information on a WLAN AP pre-scanned by the second mobile terminal 100.

When the AP information response contains a WLAN channel number or list of multiple channels after a predetermined time (not shown in the drawings), the first mobile terminal 110 performs active scanning or passive scanning on the channel or multiple channels in operation 350.

When the AP information response contains the content of the beacon/probe response frame previously transmitted by the AP, the first mobile terminal 110 does not need additional active scanning or passive scanning procedure, and thus, the first mobile terminal 110 attempts an access or association procedure in operation 360.

Figure 8:
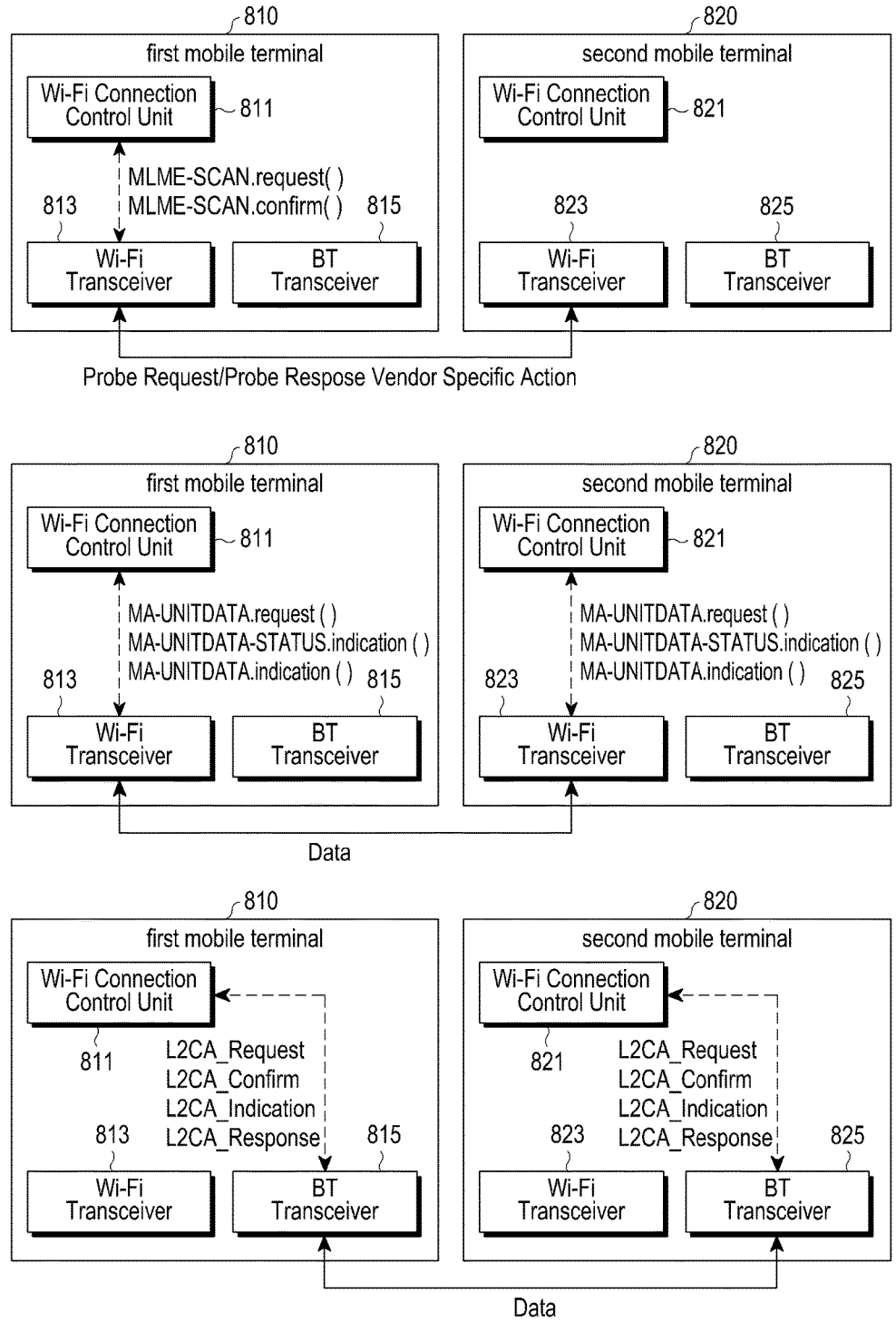
FIG. 8 is a block diagram illustrating a communication unit for scanning an AP in a wireless LAN system according to an embodiment of the present disclosure.

FIG. 8 is a block diagram illustrating a communication unit for scanning an AP in a wireless LAN system according to an embodiment of the present disclosure.

As shown in FIG. 8, reference numeral 810 denotes the first mobile terminal 110 of FIG. 1, and reference numeral 820 denotes the second mobile terminal 100 of FIG. 1.

A Wi-Fi transceiver 813 of the first mobile terminal 810 and the Wi-Fi transceiver 823 of the second mobile terminal 820 communicate a probe request, a probe response, an Independent Basic Service Set (IBSS) mode vendor specific action, and an IBSS mode data frame. The communications between the Wi-Fi transceiver 813 and the Wi-Fi transceiver 823 may correspond to, e.g., operations 341, 342, and 343 of FIG. 3, operations 441, 442, and 443 of FIG. 4, and operations 641, 642, 643, 644, and 645 of FIG. 6.

The BT transceiver 815 of the first mobile terminal 810 and the BT transceiver 825 of the second mobile terminal 820 communicate BT-related data. The communications between the BT transceiver 815 and the BT transceiver 825 may correspond to, e.g., operations 721 and 722 of FIG. 7.

When the Wi-Fi transceiver 813 of the first mobile terminal 810 and the Wi-Fi transceiver 823 of the second mobile terminal 820 exchange information using management-type frames, such as a probe request, probe response, or an IBSS mode vendor specific action frame, a Wi-Fi connection control unit 811 and the Wi-Fi transceiver 813 may communicate with each other using an MLME-SCAN.request( ) primitive and MLME-SCAN.config( ) primitive. In this case, the Wi-Fi connection control unit 811 may designate a specific type of frame to be used by the Wi-Fi transceiver 813 in the MLME-SCAN.request( ) as a parameter. When there are no special parameters, a particular type of frame may be determined by the Wi-Fi transceiver 813. When the Wi-Fi transceiver 813 of the first mobile terminal 810 and the Wi-Fi transceiver 823 of the second mobile terminal 820 exchange information using frames of a data type such as an IBSS mode data frame, the Wi-Fi connection control unit 811 may communicate with the Wi-Fi transceiver 813 using an MA-UNITDATA.request( ), MA-UNIT-DATA-STATUS.indication( ), and MA-UNITDATA.indication( ) primitives.

Meanwhile, the Wi-Fi connection control unit 811 and BT transceiver 815 of the first mobile terminal 810 and the Wi-Fi connection control unit 821 and BT transceiver 825 of the second mobile terminal 820, when communicating information using BT data frames, may communicate with each other using an L2CA_Request, L2CA_Confirm, L2CA_Indication, and L2CA_Response primitive.

Figure 9:
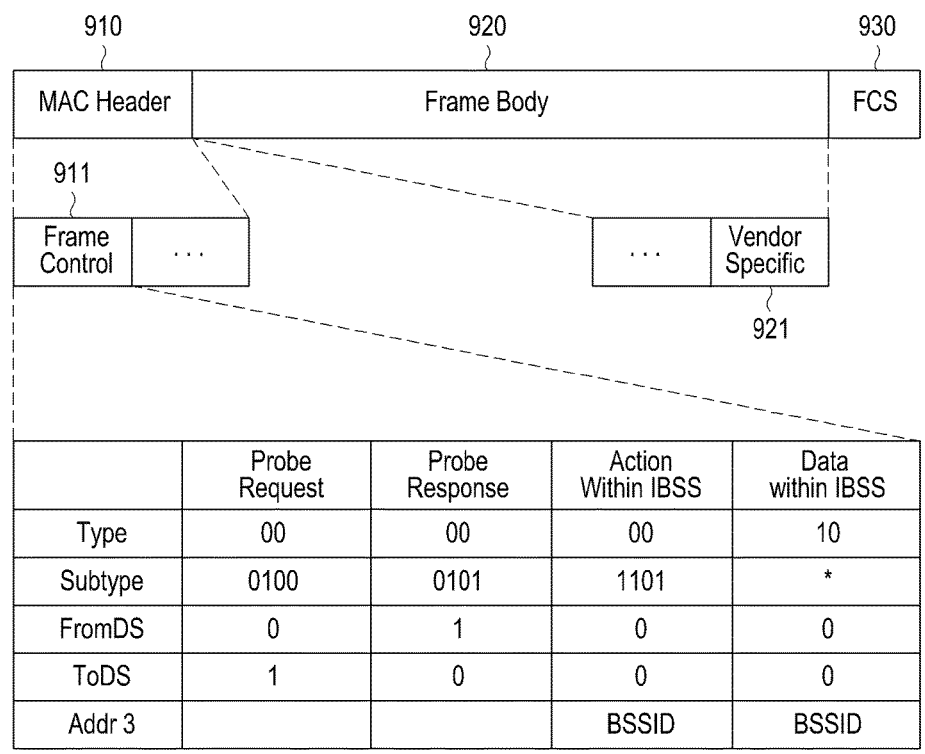
FIG. 9 is a view illustrating a frame structure for scanning an AP in a wireless LAN system according to an embodiment of the present disclosure.

FIG. 9 is a view illustrating a frame structure for scanning an AP in a wireless LAN system according to an embodiment of the present disclosure.

Referring to FIG. 9, the frame structure includes an MAC header 910, a frame body 920, and a frame check sequence (FCS) 930.

The MAC header 910 includes a frame control 911. The frame control 911, as shown in FIG. 9, includes control information regarding a probe request, a probe response, an intra-IBSS action, and intra-IBSS data.

The vendor specific field in the probe request has the type set to, e.g., "00," and the subtype set to "0100."

In the case the IBSS mode data frame included in the AP information request, the type is set to, e.g., "10."

The frame body field 920 includes a fragment number field (not shown in the drawings), a vendor specific field 921, and an IBSS mode data frame (not shown in the drawings). The frame body field 920 may further include a basic service set identification (SSID) field, a supported rates field, a request information field, and an extended supported rates field. The SSID field indicates an identification of a BSS or IBSS, and the supported rates field indicates supportable data rates. The information on the supportable data rates, as necessary, may be selectively included in the extended supported rates field.

Further, the request information field may be used to allow a device responsive to the probe request frame to request information to be included in the probe response frame.

The FCS field 930 may include cyclic redundancy check (CRC) information regarding frame error correction.

Figure 10:
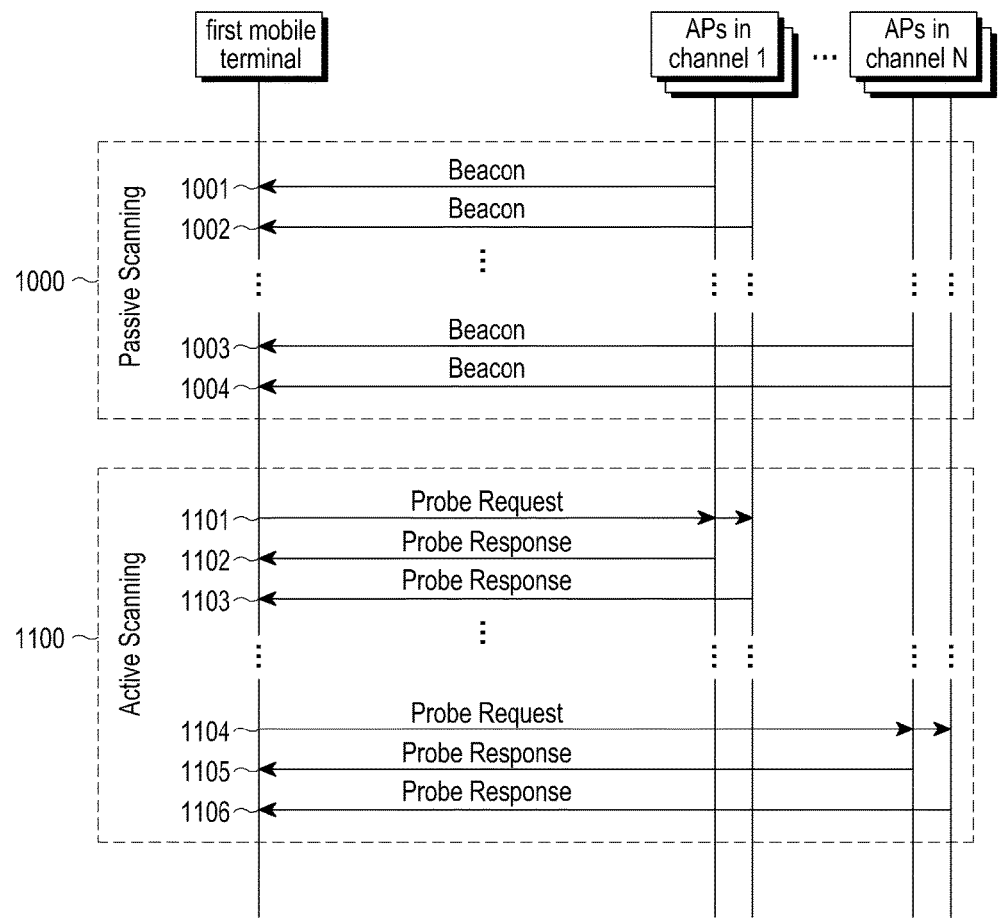
FIG. 10 is a flowchart illustrating a method for scanning an AP in a wireless LAN system according to an embodiment of the present disclosure.

FIG. 10 is a flowchart illustrating a method for scanning an AP in a wireless LAN system according to an embodiment of the present disclosure.

Referring to FIG. 10, in operations 1001 and 1002, APs on channel 1 broadcast beacon messages to the first mobile terminal.

In operations 1003 and 1004, APs on channel N broadcast beacon messages to the first mobile terminal.

Operations 1001 to 1004 are directed to a passive scanning method in which an AP periodically broadcasts beacon frames to the first mobile terminal.

Referring to FIG. 10, in operation 1101, the first mobile terminal transmits probe request messages to APs on channel 1. Then, the APs on channel 1 transmit probe response messages to the first mobile terminal responsive to the probe request messages as in operations 1102 and 1103.

Likewise, referring to FIG. 10, in operation 1104, the first mobile terminal transmits probe request messages to APs on channel N. Then, the APs on channel N transmit probe response messages to the first mobile terminal responsive to the probe request messages as in operations 1105 and 1106.

Operations 1101 to 1106 of FIG. 10 are directed to an active scanning method in which when the first mobile terminal requests, an AP responds.

A method and apparatus for scanning an AP in a wireless LAN system according to an embodiment of the present disclosure may be implemented in hardware, software, or a combination of hardware and software. Such software may be stored in a volatile or non-volatile storage device such as a read-only memory (ROM) or other storage devices, a memory, such as a random access memory (RAM), a memory chip, a device or an integrated circuit, or a storage medium, such as, e.g., a compact disc (CD), a digital video disc (DVD), a magnetic disk, or a magnetic tape, which allows for optical or magnetic recording while simultaneously read out by a machine (e.g., a computer). A method for scanning an AP in a wireless LAN system according to an embodiment of the present disclosure may be implemented by a computer or portable terminal including a controller and a memory, and the memory may be an example of a storage medium that may be read out by a machine appropriate to store a program or programs including instructions for realizing the embodiments of the present disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

An apparatus for scanning an AP in a wireless LAN system according to embodiments of the present disclosure may receive the program from a program providing device wiredly or wirelessly connected thereto and store the same. The program providing device may include a memory for storing a program including instructions to enable the program processing device to perform a method for scanning an AP in a preset wireless LAN system and information necessary for the method for scanning an AP in a wireless LAN system, a communication unit for performing wired or wireless communication with the program processing device, and a controller transmitting the program to the communication device automatically or at the request of the program processing device.

As is apparent from the foregoing description, the present disclosure may minimize power consumption caused by performing scanning on a WLAN AP.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

What is claimed is:

1. A method for access point (AP) scanning by a first mobile terminal in a wireless local area network (WLAN) system, the method comprising:

transmitting a request for AP information to a second mobile terminal positioned adjacent to the first mobile terminal;

obtaining the AP information from the second mobile terminal;

determining whether the AP information includes at least one of a beacon response frame or a probe response frame associated with an AP;

when the AP information does not include both of the beacon response frame and the probe response frame associated with the AP, performing an AP scanning on a channel according to the AP information obtained from the second mobile terminal, and when the AP information includes the at least one of the beacon response frame or the probe response frame associated with the AP, performing an association with the AP using the obtained AP information without the AP scanning.

2. The method as claimed in claim 1, wherein the AP information includes channel information when the AP is present in the channel.

3. The method as claimed in claim 1, wherein the AP information includes channel information comprising a list of one or more WLAN channel numbers corresponding to at least the AP.

4. The method as claimed in claim 3, wherein the channel information includes at least one of an address of the at least the AP, a service set identifier (SSID), and a media access control (MAC) address of the at least the AP.

5. The method as claimed in claim 1, wherein the AP information includes a content corresponding to overall information of at least one of a beacon frame and a probe response frame transmitted to the second mobile terminal from an AP of interest with respect to the first mobile terminal.

6. The method as claimed in claim 1, further comprising:

when the AP information includes the at least one of the beacon response frame or the probe response frame associated with the AP, storing a time that the AP information is obtained.

7. An apparatus for access point (AP) scanning by a first mobile terminal in a wireless local area network (WLAN) system, the apparatus comprising a controller configured to:

transmit a request for AP information to a second mobile terminal positioned adjacent to the first mobile terminal;

obtain the AP information from the second mobile terminal;

determine whether the AP information includes at least one of a beacon response frame or a probe response frame associated with an AP; and when the AP information does not include both of the beacon response frame and the probe response frame associated with the AP, perform an AP scanning on a channel according to the AP information obtained from the second mobile terminal, and when the AP information includes the at least one of the beacon response frame or the probe response frame associated with the AP, perform an association with the AP using the obtained AP information without the AP scanning.

8. The apparatus as claimed in claim 7, wherein the AP information includes channel information when the AP is present in the channel.

9. The apparatus as claimed in claim 7, wherein the AP information includes channel information comprising a list of one or more WLAN channel numbers corresponding to at least the AP.

10. The apparatus as claimed in claim 9, wherein the channel information includes at least one of an address of the at least the AP, a service set identifier (SSID), and a media access control (MAC) address of the at least the AP.

11. The apparatus as claimed in claim 7, wherein the AP information includes a content corresponding to overall information of at least one of a beacon frame and a probe response frame transmitted to the second mobile terminal from the AP of interest with respect to the first mobile terminal.

12. The apparatus as claimed in claim 7, wherein the controller is configured to:

when the AP information includes the at least one of the beacon response frame or the probe response frame associated with the AP, store a time that the AP information is obtained.

13. A method for access point (AP) scanning by a second mobile terminal in a wireless local area network (WLAN) system, the method comprising:

receiving a request, which includes a filtering condition, for AP information from a first mobile terminal positioned adjacent to the second mobile terminal; and transmitting the AP information to the first mobile terminal, wherein:

when the AP information does not include both of the beacon response frame and the probe response frame associated with the AP, wherein the first mobile terminal perform an AP scanning on a channel according to the AP information obtained from the second mobile terminal, and when the AP information includes the at least one of the beacon response frame or the probe response frame associated with the AP, wherein the first mobile terminal perform an association with the AP using the obtained AP information without the AP scanning.

14. The method as claimed in claim 13, wherein the AP information includes channel information when the AP is present in the channel.

15. The method as claimed in claim 13, wherein the AP information includes channel information comprising a list of one or more WLAN channel numbers corresponding to at least the AP.

16. The method as claimed in claim 15, wherein the channel information includes at least one of an address of the at least the AP, a service set identifier (SSID), and a media access control (MAC) address of the at least the AP.

17. The method as claimed in claim 13, wherein the AP information includes a content corresponding to overall information of at least one of a beacon frame and a probe response frame transmitted to the second mobile terminal from an AP of interest with respect to the first mobile terminal.

18. An apparatus for access point (AP) scanning by a mobile terminal in a wireless local area network (WLAN) system, the apparatus comprising:

a controller configured to:

receive a request, which includes a filtering condition, for AP information from a neighboring mobile terminal positioned adjacent to the mobile terminal; and transmit the AP information to the first mobile terminal, wherein:

when the AP information does not include both of the beacon response frame and the probe response frame associated with the AP, wherein the first mobile terminal perform an AP scanning on a channel according to the AP information obtained from the second mobile terminal, and when the AP information includes the at least one of the beacon response frame or the probe response frame associated with the AP, wherein the first mobile terminal perform an association with the AP using the obtained AP information without the AP scanning.

19. The apparatus as claimed in claim 18, wherein the AP information includes channel information when the AP is present in the channel.

20. The apparatus as claimed in claim 18, wherein the AP information includes channel information comprising a list of one or more WLAN channel numbers corresponding to at least the AP.

21. The apparatus as claimed in claim 20, wherein the channel information includes at least one of an address of the at least the AP, a service set identifier (SSID), and a media access control (MAC) address of the at least the AP.

22. The apparatus as claimed in claim 18, wherein the AP information includes a content corresponding to overall information of at least one of a beacon frame and a probe response frame transmitted to the mobile terminal from an AP of interest with respect to the neighboring mobile terminal.

\* \* \* \* \*